United States Patent
Ogawa et al.

(10) Patent No.: US 7,508,538 B2
(45) Date of Patent: Mar. 24, 2009

(54) IMAGE DATA ROTATION APPARATUS

(75) Inventors: Tomoya Ogawa, Hachioji (JP); Tomohiro Suzuki, Nishitokyo (JP); Yuji Tamura, Hachioji (JP); Tetsuya Ishikawa, Hachioji (JP); Hiroyasu Nishimura, Hachioji (JP); Fumikage Uchida, Asaka (JP); Nao Moromizato, Hachioji (JP); Masayuki Yasukaga, Hachioji (JP)

(73) Assignee: Konica Minolta Business Technologies, Inc. (JP)

( * ) Notice: Subject to any disclaimer, the term of this patent is extended or adjusted under 35 U.S.C. 154(b) by 850 days.

(21) Appl. No.: 10/971,324

(22) Filed: Oct. 22, 2004

(65) Prior Publication Data

US 2005/0259294 A1 Nov. 24, 2005

(30) Foreign Application Priority Data

May 21, 2004 (JP) ............................. 2004-151355

(51) Int. Cl.
*H04N 1/40* (2006.01)
(52) U.S. Cl. ...................... 358/1.17; 358/1.16; 358/448
(58) Field of Classification Search .................. 358/1.9, 358/2.1, 1.15–1.18, 448, 451; 382/295–299
See application file for complete search history.

(56) References Cited

U.S. PATENT DOCUMENTS

2003/0158608 A1 * 8/2003 Ishikawa et al. ............... 700/2

FOREIGN PATENT DOCUMENTS

JP 2000-268169 9/2000

OTHER PUBLICATIONS

English Abstract for JP 2000-268169.

* cited by examiner

*Primary Examiner*—Thomas D Lee
*Assistant Examiner*—Stephen M Brinich
(74) *Attorney, Agent, or Firm*—Cantor Colburn LLP

(57) ABSTRACT

An image processing apparatus includes: a first memory for storing 2-D image data wherein pixels are arranged in a matrix in the main scanning direction and sub-scanning direction orthogonal to each other; a second memory; and a data control section for controlling the first memory and second memory, wherein at least one of the first and second memories is constituted by a SDRAM. The data control section reads the image data from the first memory in blocks of m pixels in the main scanning direction and n pixels in the sub-scanning direction (where n and m are natural numbers), writes the read data into the second memory, and transmits data to the memory composed of the SDRAM by burst transmission and continuous supply of desired column addresses, thereby allowing the read image data to be rotated.

8 Claims, 4 Drawing Sheets

FIG. 4 (a) CLK
FIG. 4 (b) COMMAND
FIG. 4 (c) ADDRESS
FIG. 4 (d) DATA
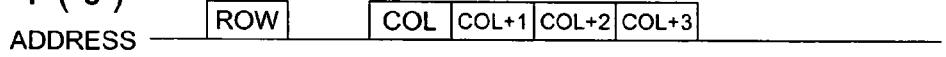
FIG. 5 (a) CLK
FIG. 5 (b) COMMAND
FIG. 5 (c) ADDRESS
FIG. 5 (d) DATA
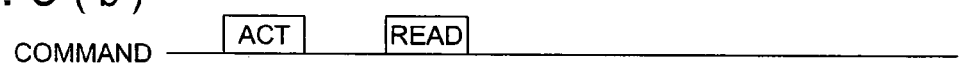
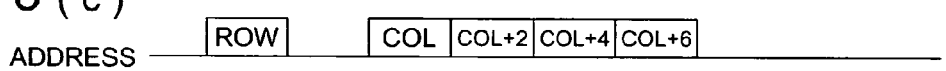
FIG. 6
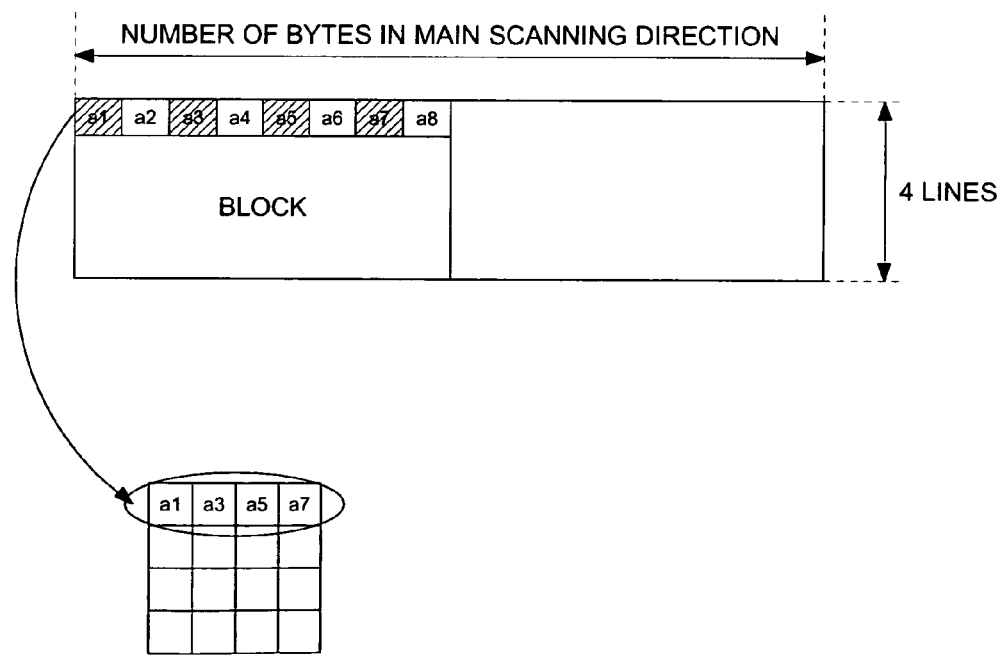

FIG. 7
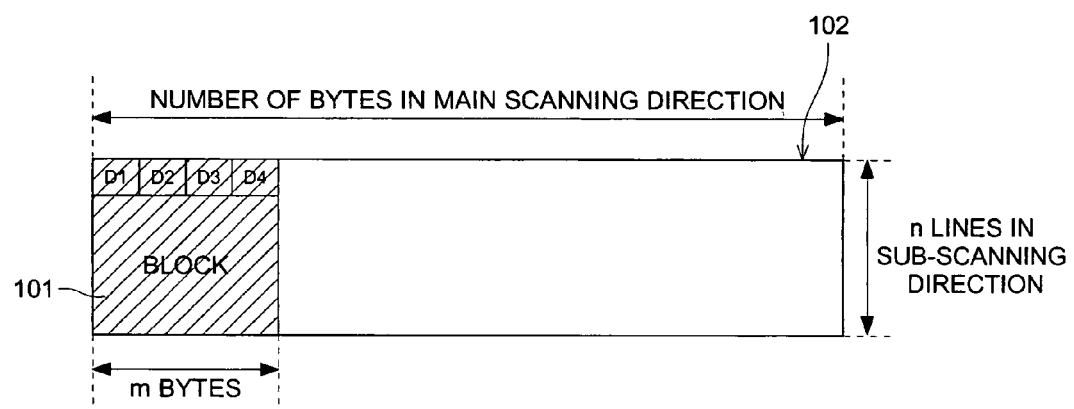
FIG. 8 (a) CLK
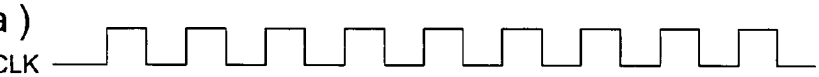
FIG. 8 (b) COMMAND
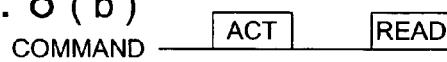
FIG. 8 (c) ADDRESS
FIG. 8 (d) DATA
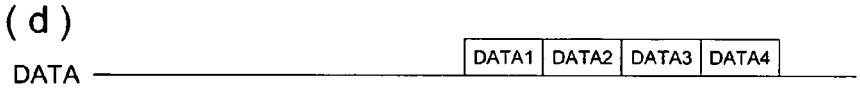

IMAGE DATA ROTATION APPARATUS

BACKGROUND OF THE INVENTION

The present invention relates to an image data rotation apparatus for rotating image data.

A copying machine or similar apparatus uses the rotation method, wherein when rotating one-page image data, the entire page is rotated by the repeating the steps of scanning the image data in blocks each consisting of m pixels by n pixels (where m and n denote natural numbers) from the image memory; applying a 90-degree or 180-degree rotation to each block; and writing the block having been rotated, into a predetermined location of the page memory.

As shown in FIG. 7, for example, when the image data of one block consisting of four pixels by n pixels is scanned from an image memory 102, the four-pixel image data items D1 through D4 continuously arranged on one and the same line are read as the one-row image data of the block. Reading of each row is repeated n times, whereby one-block image data is read.

An image data rotation apparatus is disclosed (for example, Japanese Patent Tokkai 2000-268169) wherein the burst mode of SDRAM (Synchronous Dynamic Random Access Memory) is employed to increase the processing speed in the reading and writing of image data in blocks, as described above.

In the SDRAM burst mode, as shown in FIGS. 8(a) through 8(d), when the column address (COL) has been given after the row address (ROW), the SDRAM automatically increments the column address until the preset number of bursts (4 in this case) has been reached, thereby reading the data continuously.

In this apparatus, the one-row image data items D1 through D4 of the block are stored in the continuous addresses on the image memory 102. This is utilized to read and write the one-row image data in the SDRAM burst mode, thereby increasing data transfer speed.

In the SDRAM burst mode, the address is automatically incremented "1" by the number of bursts from the column address given in the beginning. Thus, this applies only to the cases where the image data items constituting one row of the block are arranged in the continuous addresses on the image memory. Consequently, this prior art is incapable of simultaneous processing of rotation and reduction by reading the one-row image data on the block while thinning out pixels.

SUMMARY OF THE INVENTION

The present invention has been made to solve the aforementioned problem. It is the object of the present invention to provide an image data rotation apparatus capable of enlargement and reduction of an image simultaneously with the rotation thereof, while maintaining the high-speed access to the image memory.

The aforementioned object can be achieved by any one of the structures (1) through (5) described below:

(1) An image processing apparatus comprising: a first memory for storing 2-D image data wherein pixels are arranged in a matrix in the main scanning direction and sub-scanning direction orthogonal to each other; a second memory; and a data control section for controlling the aforementioned first memory and second memory, wherein at least one of the first and second memories is constituted by an SDRAM; and the data control section reads the image data from the first memory in blocks of m pixels in the main scanning direction and n pixels in the sub-scanning direction (where n and m are natural numbers), writes the read data into the second memory, and performs the processing of data transmission to the memory composed of the aforementioned SDRAM by burst transmission and continuous supply of desired column addresses, thereby allowing the read image data to be rotated.

(2) The image processing apparatus described in the structure (1) wherein the aforementioned data control section gives one of the row addresses inside the SDRAM to enable transmission of the image data in the row, and sequentially selects a desired column in the row address, thereby allowing the image data of the selected column to be transmitted.

(3) The image processing apparatus described in the structure (1) wherein the aforementioned data control section, when selecting a desired column address in the row address, thins out the columns, and transmits the data.

(4) The image processing apparatus described in the structure (1) wherein each of the first and second memories is constituted by an SDRAM.

(5) The image processing apparatus described in the structure (1) wherein the first and second memories are arranged in one and the same SDRAM.

The aforementioned object can also be achieved by any one of more preferable structures (6) through (10).

(6) An image data rotation apparatus, comprising the steps of: reading the image data in blocks each having m pixels in the main scanning direction by n pixels in the sub-scanning direction (where m and n denote natural numbers), from the image memory storing the 2-D image data arranged in a matrix in the main scanning direction and sub-scanning direction orthogonal to each other; applying rotation to this image data; and writing the image data having been rotated into the image memory, wherein at least either the image memory from which the image data is read or the image memory to which it is written is composed of an SDRAM, and access to this SDRAM is made in the burst access mode according to the random column method.

According to the structure (6), when the image data in blocks each consisting of m pixels by n pixels is read from or written into the image memory composed of the SDRAM, access to this SDRAM is made in the burst access mode by the random column method. The random column method is a mode of operation wherein desired column addresses are given on a continuous basis when the SDRAM is activated by a row address assigned thereto, and access is made to the areas specified by this row address and column address one after another, thereby allowing the process of reading and writing to be performed.

The burst access according to the random column method allows access to desired addresses on a continuous basis if the area belongs to one row address. This ensures high-speed data transmission and flexible address configuration. Since the random column method cannot use the automatic increment function of the address of the SDRAM, the column address assigned to the SDRAM is generated by the image data rotation apparatus.

It does not matter from which part in one block the image data is read or written in one process of burst access according to the random column method. For example, the image data of one row of the block or the image data of the entire block may be read and written in one burst access operation if the image of n-line in the main scanning direction is stored in one row address.

(7) The image data rotation apparatus described in the structure (6) wherein the image data of a plurality of pixels arranged in the main scanning direction is read or written in the burst access mode according to the random column method.

According to the structure (7), the image data of a plurality of pixels arranged in the main scanning direction is read or written in the burst access mode according to the random column method. For example, if the image data of one row (m pixel) in the main scanning direction is read and written in one operation of burst access, then the image data of one block can be read and written in n-operations of burst access.

(8) The image data rotation apparatus described in the structure (6) or (7) wherein the image memory from which the data is read is composed of a plurality of work memories having the area for all the pixels on one line in the main scanning direction, by n pixels, and the work memories are switched sequentially to form an image memory from which the data is read.

According to the structure (8), a plurality of work memories arranged for the n-line are switched for use as the image memory from which the data is read. For example, while the image data rotation apparatus is performing the process of reading the one-line image data stored in a work memory in units of blocks, the next n-line image data is stored in another work memory. A minimum of two work memories is required.

(9) The image data rotation apparatus described in the structure (8) wherein the image memory in which the image data having been rotated is written is a page memory, and the aforementioned work memory is arranged in the unoccupied area of the SDRAM constituting the page memory.

According to the structure (9), the work memories are provided in the unoccupied area of the SDRAM constituting the page memory. Since the storage capacity of the SDRAM can be increased or decreased only in a certain unit (unit conforming to the number of bits in the address), normally the memory capacity required for the page memory and the SDRAM storage capacity do not agree with each other, and some fragmentary area remains. This remaining area is used to arrange the work memory.

(10) The image data rotation apparatus described in the structure (6), (7), (8) or (9) wherein an image is enlarged or reduced by controlling the address when making burst access according to the random column method.

According to the structure (10), when the image data is read or written in blocks among the image memories, an image is enlarged or reduced by controlling the address when making burst access according to the random column method. To be more specific, when the m pixels are read in the main scanning direction by burst access in the random column method, if the column addresses provided by the SDRAM are generated in a discontinuous manner, and the pixels are thinned out; then the image data can be read by the image data rotation apparatus while being reduced in the main scanning direction. If the same column address is generated several times, the image data can be read and written while being enlarged in the main scanning direction.

According to the image data rotation apparatus of the present invention, when image data is written in the image memory composed of the SDRAM in blocks each consisting of m pixels by n pixels, access to the SDRAM is made in the burst access mode of the random column method. This arrangement provides flexible addressing for data transmission between the image memory and image data rotation apparatus.

If the column addresses assigned to the SDRAM are discontinuously generated or the same address is generated several times, the enlargement or reduction of the image can be performed simultaneously with image rotation, while the high speed of access due to burst access mode is maintained. Thus, this arrangement has the advantage of improving the overall processing speed as compared to the case where rotation is performed separately from enlargement/reduction.

In a system provided with a plurality of work memories consisting of all the pixels on one line in the main scanning direction, by n pixels, where these work memories are switched for use as the image memory from which the data is read, the storage capacity required for the image memory will be reduced. Further, if the area of SDRAM remaining after having been reserved for the page memory is used to arrange the work memories, the required number of the memory devices will be reduced, with the result that the price of the apparatus can be reduced.

BRIEF DESCRIPTION OF THE DRAWINGS

FIGS. 4(a) through 4(d) are the timing charts showing various signals in the case of burst access by incrementing the column addresses by "1" in the random column method;

FIGS. 5(a) through 5(d) are the timing charts showing various signals sent to the memory section by the data control section during image rotation, with the length in the main scanning direction being reduced to a half;

FIG. 6 is an explanatory diagram showing that image data is read into the rotation register from the work memories by skipping every other pixel;

FIG. 7 is an explanatory diagram showing that the image data is read in 4-pixel by n-pixel blocks from the image memory in the prior art image data rotation apparatus; and FIGS. 8(a) through 8(d) are the timing charts representing the states of various signals when the burst mode of the SDRAM is used to automatically increment the column address.

DETAILED DESCRIPTION OF THE PREFERRED EMBODIMENT

Figure 1:
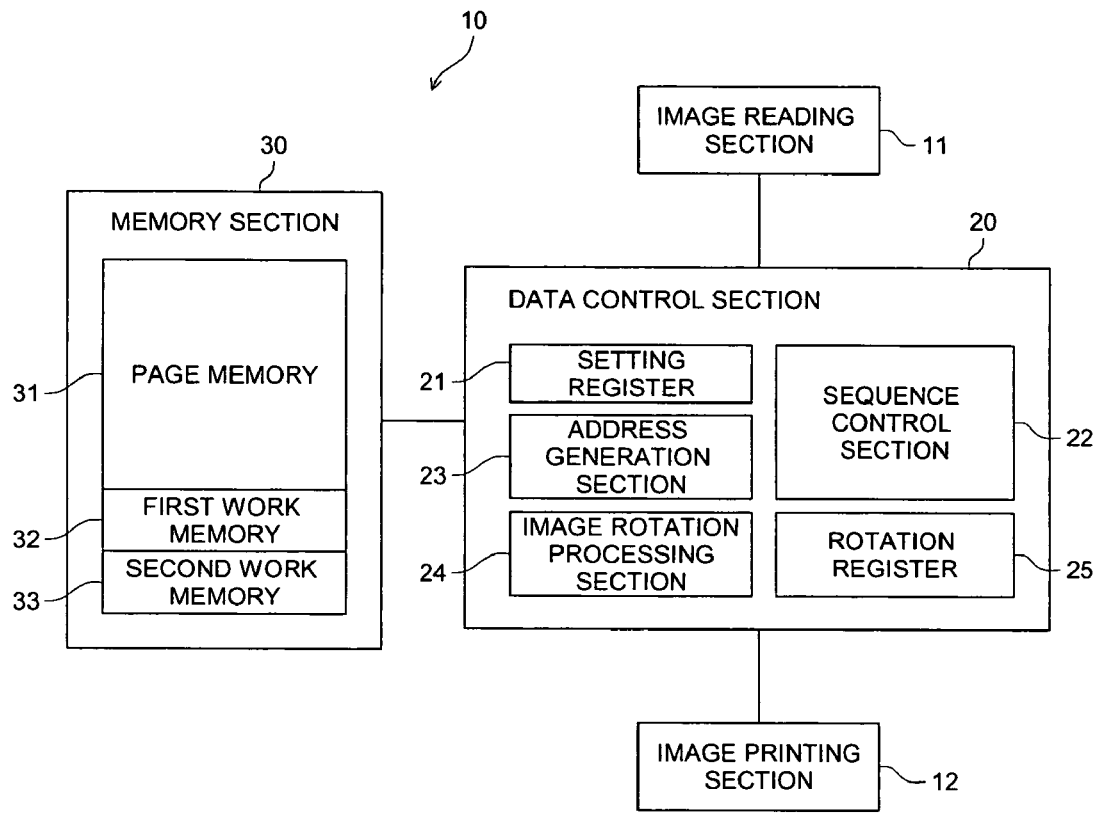
FIG. 1 is a block diagram representing the configuration of a digital copying machine including an image data rotation apparatus as an embodiment of the present invention.

The following describes the preferred embodiment of the present invention with reference to drawings:

FIG. 1 shows the configuration of a digital copying machine 10 including an image data rotation apparatus as an embodiment of the present invention. The digital copying machine 10 has an image reading section 11, a data control section 20, an image printing section 12 and a memory section 30.

The image reading section 11 has a function of reading a 2-D image by repeatedly reading the image of one line in the main scanning direction while shifting the reading position in the sub-scanning direction orthogonal to the main scanning direction. Here it has a light source extending in the main scanning direction for applying light to a document, a line image sensor for reading one line of the document in the main scanning direction, a shifting device for shifting the reading position in units of line in the sub-scanning direction, and an optical path consisting of a lens and mirror for leading the reflected light from the document, to the image sensor and forming an image. The line image sensor contains a CCD (charge coupled device). The analog image signal outputted from the line image sensor is subjected to analog-to-digital conversion, and is read as digital image data.

The image printing section 12 allows the image corresponding to the image data to be formed on a recording medium by the electrophotographic process, and to be outputted. The image printing section 12 is configured as a so-called laser printer that has a recording paper conveyance apparatus, a photoconductor drum, a charging device, a laser unit, a development apparatus, a transfer and separation apparatus, a cleaning apparatus and a fixing apparatus.

The memory section 30 is a memory for storing the image data, and is composed of an SDRAM. The memory section 30 has a page memory 31 of the size capable of storing the document of the maximum size that can be read by the image reading section 11, at the maximum resolution. The first work memory 32 and second work memory 33 are provided in the area remaining after the page memory 31 has been reserved. In this embodiment, the first and second work memories 32, 33 are provided as a first memory, and the page memory 31 is provided as a second memory. Further the first and second memories are composed of SDRAM both.

The first work memory 32 and second work memory 33 each have the size covering all the pixels on one line in the main scanning direction, by n-lines, when the document of the maximum size that can be read by the image reading section 11 has been read at the maximum resolution. Here each pixel is represented in 8-bit multiple gradations, and one pixel is carried by one byte. Further, the memory section 30 has an 8-bit data bus width. Thus, the memory section 30 has image data of one pixel stored in one address.

The data control section 20 as an image data rotation apparatus performs a function of controlling the flow of image data. To be more specific, it performs a function of storing the image data read by the image reading section 11, in the work memories 32 and 33 of the memory section 30; a function of reading the image data from the work memories 32 and 33 in blocks each consisting of m pixels in the main scanning direction, by n-lines in the sub-scanning direction, and rotating it; a function of writing the image data having been rotated, into the page memory 31; and a function of outputting the image data to the image printing section 12 from the page memory 31. In this case, m=n=4.

To perform the aforementioned functions, the data control section 20 is provided with a setting register 21, a sequence control section 22, an address generation section 23, an image rotation processing section 24 and a rotation register 25.

The setting register 21 stores the information of various types representing the operation conditions as well as operation instructions. For example, the number of the pixels, in the main scanning direction, of the document read by the image reading section 11, the number of lines in the sub-scanning direction, the leading addresses of the page memory 31, first work memory 32 and second work memory 33, the angle of rotation, scaling factor in the main scanning direction, and startup command are inputted, set and registered. They are inputted from the CPU (Central Processor Unit) (not illustrated) that administers the operations of the digital multifunction device 10.

The sequence control section 22 controls the flow of a sequence of processes performed by the data control section 20. The address generation section 23 generates the address signals and command signals to access the page memory 31, first work memory 32 and second work memory 33. The rotation register 25 registers the one-block image data read from the work memories 32 and 33, in the register.

The image rotation processing section 24 stores the image memory into the rotation register 25 and reads the image data from the rotation register 25. The image is rotated by controlling the direction of storing into the rotation register 25 and direction of reading from the rotation register 25. The angle of rotation is any one of 0, 90, 180 and 270 degrees.

Figure 2:
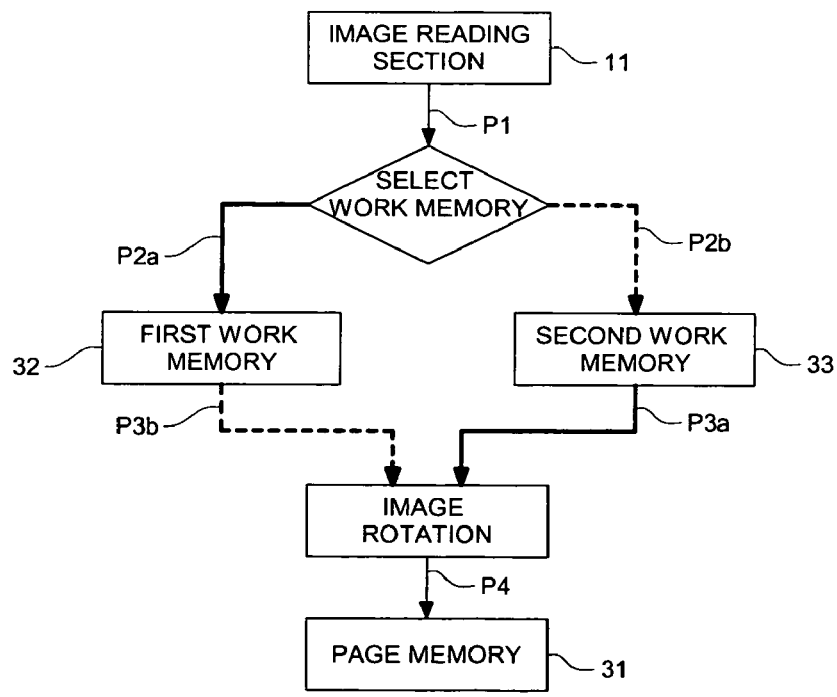
FIG. 2 is an explanatory diagram of the data flow showing the process of rotating the image data sequentially inputted from an image reading section, and loading them into the page memory.

FIG. 2 is a data flow showing the process of rotating the image data sequentially inputted from the image reading section 11, and loading them into the page memory 31. When the image reading section 11 has started to read the document, the image data is sequentially inputted from the image reading section 11 to the data control section 20 (P1). To be more specific, the image data on one line in the main scanning direction is sequentially inputted from the top position of the page to the end position.

The data control section 20 switches between the first work memory 32 and second work memory 33 alternately so that one of them is used as a work memory to store the image data to be inputted sequentially from the image reading section 11, and the other is used as a work memory from which the image data for rotation is read. To be more specific, when the image data inputted from the image reading section 11 is stored in the first work memory 32 (P2a), the image data for rotation is read from the second work memory 33 in blocks (P3a). In the meantime, when the image data inputted from the image reading section 11 is stored into the second work memory 33 (P2b), the image data for rotation is read in blocks from the first work memory 32 (P3b).

The image data read into the rotation register 25 of the data control section 20 is rotated and is then stored in the page memory 31 (P4). When the image reading section 11 stores the four-line data into one of other work memories, the four-line data stored in the other work memory has already been rotated, and is stored in the page memory 31.

As described above, the image reading by the image reading section 11 and rotation are performed simultaneously in a flow working system in parallel with each other, and the first work memory 32 and second work memory 33 are alternately switched so that they will alternately operate as the memory to which the data is stored and the memory from which the data is read. This arrangement reduces the storage capacity required as the image memory from which data is read, with the result that work memories 32 and 33 can be located in the area remaining after the page memory 31 has been reserved from the memory section 30.

Figure 3:
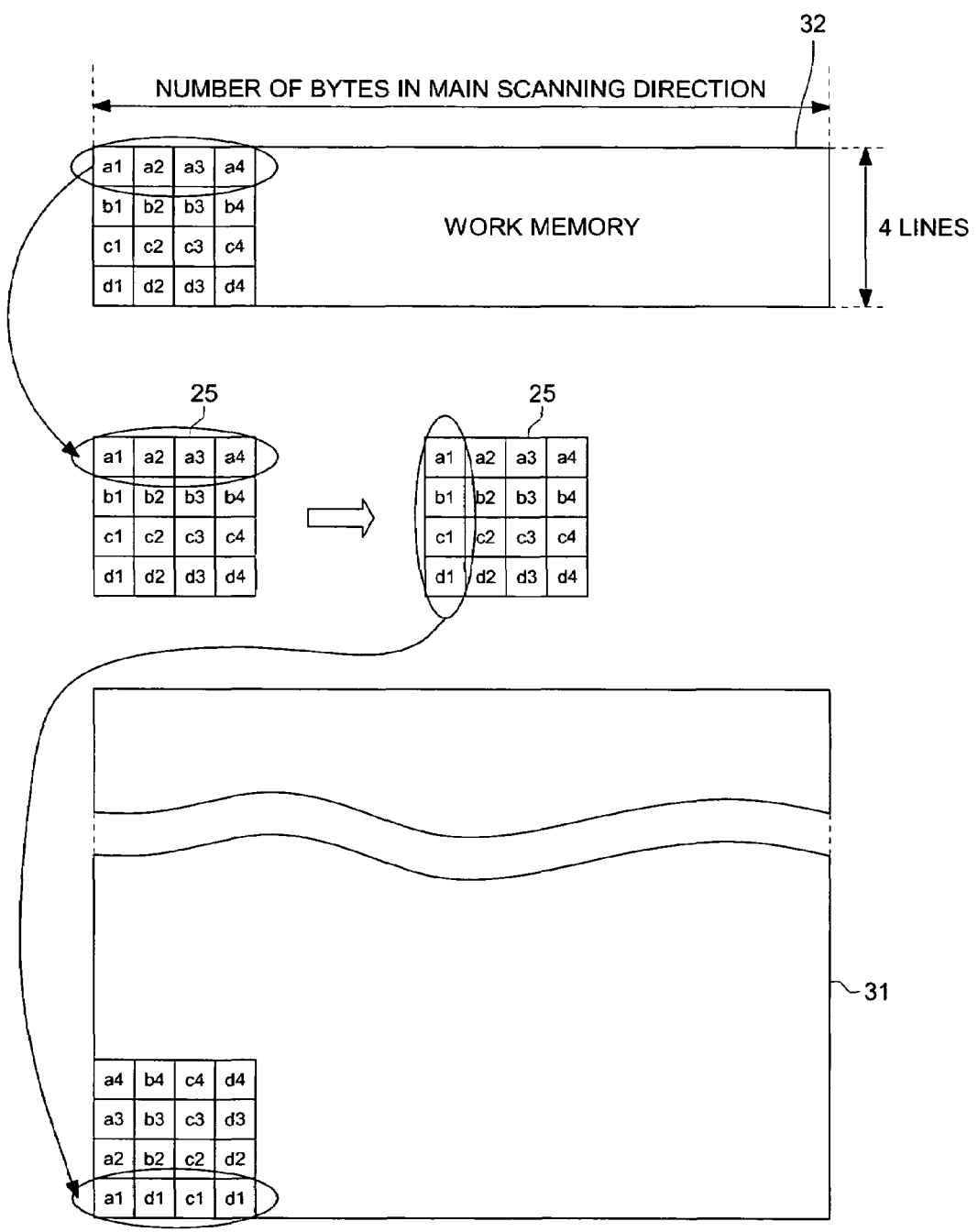
FIG. 3 is an explanatory diagram representing how the data control section rotates the image in blocks at a scaling factor of 100%.

FIG. 3 is an explanatory drawing representing how the data control section 20 rotates the image in blocks at a scaling factor of 100%. In FIG. 3, first work memory 32 is used as the memory from which data is read, and rotation is applied to the leading block in the main scanning direction.

The data control section 20 ensures that the image data items a1, a2, a3 and a4 of four pixels continuously arranged from the top of the first line is read in the burst access mode according to the random column method. In this example, rotation is applied at a scaling factor of 100%; therefore, the column addresses are generated in such a way that they are incremented by "1".

FIGS. 4(a) through 4(d) show the statuses of various signals given to the memory section 30 by the data control section 20 when the image data items a1, a2, a3 and a4 are read in the burst access mode according to the random column method. The address information is given to the SDRAM, with the high-order row address being separated from low-order column address. The activation command "ACT" and the row address corresponding to the leading address of the first line are given first. This activates the-storage area belonging to one and the same row address, and enables data read/write operations.

After that, the "READ" command for designating the reading of data and the first column address "COL" are given. Then the column addresses "COL+1", "COL+2" and "COL+3" each incremented by one are given continuously. This operation allows the image data items a1, a2, a3 and a4 to be read continuously.

As shown in FIG. 3, the four-pixel image data items a1, a2, a3 and a4 are sequentially loaded in the first row of the rotation register 25 forming a 4×4 matrix. In the similar manner, the four-pixel image data items b1, b2, b3 and b4 from the top of the second row of the first work memory 32 increment the column addresses by "1" in the burst access mode according to the random column method, and are read out continuously and stored in the second row of the rotation register 25.

In the similar manner, the four-pixel image data items c1, c2, c3 and c4 from the top of the third row of the first work memory 32 and the four-pixel image data items d1, d2, d3 and d4 from the top of the fourth row of the first work memory 32 are read in the third and fourth rows of the rotation register 25.

When the image is rotated 90 degrees to the left, the pixel a1 on the first row and first column of the rotation register 25, the pixel b1 on the second-row and first column, the pixel c1 on the third row and first column, and the pixel d1 on the fourth row and first column are written in the four-pixel position from the top of the line at the end of the page of the page memory 31 in the main scanning direction. In this case as well, the column addresses are incremented by "1" in the burst access mode according to the random column method, and four pixels are written continuously.

The pixel a2 in the first row and second column of the rotation register 25, the pixel b2 in the second row and second column, the pixel c2 in the third row and second column and the pixel d2 in the fourth row and second column are written in four-pixel positions from the top in the main scanning direction on the second line from the end of the page of the page memory 31. In this case as well, the column addresses are incremented by "1" in the burst access mode according to the random column method, and four pixels are written continuously.

In the similar manner, the pixel a3 in the first row and third column, the pixel b3 in the second row and third column, the pixel c3 in the third row and third column and the pixel d3 in the fourth row and third column are written in four-pixel positions from the top in the main scanning direction on the third line from the end of the page of the page memory 31. The pixel a4 in the first row and fourth column, the pixel b4 in the second row and fourth column, the pixel c4 in the third row and fourth column and the pixel d4 in the fourth row and fourth column are written in four-pixel positions from the top in the main scanning direction on the fourth line from the end of the page of the page memory 31.

FIGS. 5(a) through 5(d) show examples of the states of various signals sent to the memory section 30 by the data control section 20 during image rotation, with the length in the main scanning direction being reduced to a half. When the image data of four pixels in the main scanning direction is read into the first row of the rotation register 25 from the work memories 32 and 33, the address generation section 23 generates the column addresses by incrementing by "2".

To put it another way, after the first column address "COL" has been given, the column addresses each incremented by "2"—"COL+2", "COL+4" and "COL+6"—are supplied continuously. This arrangement allows the image data items a1, a3, a5 and a7 to be read continuously.

As the image data is read as described above, as shown in FIG. 6, the image data is read from the work memory by skipping every other pixel. The image data items a1, a3, a5 and a7 are read in the first row of the rotation register 25 forming a 4-pixel by 4-pixel matrix, and 50% thinning out is carried out in the main scanning direction in the read operation for rotation.

In the random column method, the method of generating the address is changed in response to the preset scaling factor. For example, when the image is enlarged to 200% and is read from the work memory, while the same column address is generated twice, the address should be incremented.

In the enlargement/reduction mode, it is also possible to make such arrangements that processing of error diffusion is applied: based on this result, the column address is produced by the data control section, and data is transferred.

Processing of enlargement/reduction in the sub-scanning direction can be performed simultaneously by designating the row address as appropriate. For example, a reduction to 50% in size can be achieved by designating every other row, and an enlargement to 200% can be provided by designating the same row twice. In this manner, processing of rotation and scaling (enlargement/reduction) can be performed in the main and sub-scanning directions simultaneously.

The processing of enlargement/reduction in the sub-scanning direction can be performed separately.

Further, processing of enlargement/reduction in the sub-scanning direction is performed separately. For example, in the case of reduction to 50%, the image data from the work memory should be read by skipping every other line, and in the case of enlargement to 200%, the same line should be read twice; alternatively, the same line should be written twice at the time of writing into the page memory 31.

As described above, if access to the page memory 31 formed by the SDRAM and work memories 32 and 33 is made in the burst access mode according to the random column method, then flexible selection of the image data to be read, as well as high-speed data read/write operation, can be ensured.

Although the embodiments of the present invention have been described with reference to drawings, it should be clearly understood that a specific configuration is not restricted to the illustrated embodiments. The present invention can be embodied in a great number of variations with appropriate modification or additions, without departing from the technological spirit and scope of the invention claimed. For example, it is also possible to make such arrangements that generation of the address in the random column method is restricted to the case where image data is read from the work memories 32 and 33, and writing into the page memory 31 is carried out in the normal burst mode where the addresses are automatically incremented.

In the aforementioned description of the embodiment, two work memories are alternately switched for use. However, it is also possible to arrange such a configuration that three or more work memories are provided so that they can be switched in a designated order. In this case, a certain allowance will occur in the relationship between rotation speed and reading speed of the image reading section 11. Further, the image memory from which image data is read can be a page memory.

In addition, in the aforementioned description of the embodiment, reduction or enlargement in the main scanning direction is carried out by controlling the column address.

However, the flexibility of the column address can be used otherwise. For example, the direction of reading the image data from the work memories can be reverse to the main scanning direction (column address decremented), whereby the image is changed into a mirror image. Further, formation of a mirror image and reduction can be performed simultaneously.

When the image data of a plurality of lines can be stored in the area activated by one row address, it is also possible to arrange such a configuration that the image data of a plurality of rows of the block is obtained in one burst access operation.

In the aforementioned description of the embodiment, access is made in 4-pixel by 4-pixel blocks. Desired numbers of pixels in the main and sub-scanning directions can be selected. They can be selected in conformity to the number of lines of the work memory that can be reserved in the memory section 30 and the matrix size of the rotation register 25 that can be accommodated in the data control section 20, for example.

Further, in the aforementioned description of the embodiment, column addresses are sequentially using a constant on a regular basis. Without being restricted thereto, the random column method allows the column addresses to be designated irregularly.

What is claimed is:

1. An image data rotation apparatus comprising:
   (a) a first memory for storing 2-D image data wherein pixels are arranged in a matrix in a main scanning direction and sub-scanning direction orthogonal to each other;
   (b) a second memory; and
   (c) a data control section for controlling the first memory and the second memory,
   wherein at least one of the first and second memories is constituted by a SDRAM, and the data control section reads the image data from the first memory in blocks of m pixels in the main scanning direction and n pixels in the sub-scanning direction, writes the read data into the second memory, and transmits data to the memory composed of the SDRAM by conducting burst transmission and continuous supply of desired column addresses, thereby allowing the read image data to be rotated, where n and m represent natural numbers,
   wherein the data control section gives one of row addresses inside the SDRAM to enable transmission of image data in the row, and sequentially selects a desired column in the row addresses, thereby allowing the image data of the selected column to be transmitted, and wherein when selecting the desired column address in the row address, the data control section thins out the columns, and transmits the data.

2. The image data rotation apparatus of claim 1, wherein each of the first and second memories is constituted by an SDRAM.

3. The image data rotation apparatus of claim 1, wherein the first and second memories are arranged in the same SDRAM.

4. An image data rotation apparatus, comprising:
   (a) a first memory for storing 2-D image data arranged in a matrix in a main scanning direction and sub-scanning direction orthogonal to each other; and
   (b) a second image memory for storing image data output form the first image data,
   wherein image data in blocks having m pixels in the main scanning direction by n pixels in the sub-scanning direction where m and n denote natural numbers, is read from the first image memory, the read image data are rotated, and the rotated image data are written into the second image memory, and
   wherein at least one of the first and second image memories is constituted by a SDRAM, and access to the SDRAM is made in a burst access mode according to a random column method, and
   wherein the image data of a plurality of pixels arranged in the main scanning direction are read or written in the burst access mode according to the random column method.

5. The image data rotation apparatus of claim 4, wherein the first image memory from which the data are read is composed of a plurality of work memories having the area for all the pixels on one line in the main scanning direction, by n pixels, and the work memories are switched sequentially to form an image memory from which the data are read.

6. The image data rotation apparatus of claim 5, wherein the second image memory in which the image data having been rotated are written is a page memory, and the work memory is arranged in an unoccupied area of the SDRAM constituting the page memory.

7. The image data rotation apparatus of claim 4, wherein an image is enlarged or reduced by controlling an address when conducting burst access according to the random column method.

8. An image data rotation apparatus, comprising:
   (a) a first memory for storing 2-D image data arranged in a matrix in a main scanning direction and sub-scanning direction orthogonal to each other; and
   (b) a second image memory for storing image data output form the first image data,
   wherein image data in blocks having m pixels in the main scanning direction by n pixels in the sub-scanning direction where m and n denote natural numbers, is read from the first image memory, the read image data are rotated, and the rotated image data are written into the second image memory, and
   wherein at least one of the first and second image memories is constituted by a SDRAM, and access to the SDRAM is made in a burst access mode according to a random column method,
   wherein the first image memory from which the data are read is composed of a plurality of work memories having the area for all the pixels on one line in the main scanning direction, by n pixels, and the work memories are switched sequentially to form an image memory from which the data are read.

* * * * *